(12) United States Patent
Hustava et al.

(10) Patent No.: US 10,345,445 B2
(45) Date of Patent: Jul. 9, 2019

(54) CIRCUIT FOR ACOUSTIC DISTANCE MEASURING

(71) Applicant: SEMICONDUCTOR COMPONENTS INDUSTRIES, LLC, Phoenix, AZ (US)

(72) Inventors: Marek Hustava, Bratislava (SK); Tomas Pikula, Bratislava (SK); Tomas Suchy, Brno (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 381 days.

(21) Appl. No.: 15/212,537

(22) Filed: Jul. 18, 2016

(65) Prior Publication Data

US 2017/0123055 A1 May 4, 2017

Related U.S. Application Data

(60) Provisional application No. 62/249,701, filed on Nov. 2, 2015.

(51) Int. Cl.
*G01S 15/00* (2006.01)
*G01S 15/93* (2006.01)
(Continued)

(52) U.S. Cl.
CPC .......... *G01S 15/931* (2013.01); *G01S 7/527* (2013.01); *G01S 15/18* (2013.01); *G01S 15/876* (2013.01);
(Continued)

(58) Field of Classification Search
None
See application file for complete search history.

(56) References Cited

U.S. PATENT DOCUMENTS 3,836,842 A * 9/1974 Zimmermann ........ G01O 15/06
324/239
3,959,586 A * 5/1976 Blomenkamp ...... H04B 14/026
375/238

(Continued)

*Primary Examiner* — Isam A Alsomiri
*Assistant Examiner* — Jonathan D Armstrong
(74) *Attorney, Agent, or Firm* — Polansky & Associates, P.L.L.C.; Paul J. Polansky; Rosalynn M. Smith

(57) ABSTRACT

In one form, an acoustic signal is generated for an acoustic transducer, where the acoustic transducer is susceptible to reverberation that defines a close proximity indication zone. The start of a close proximity indication zone window is defined after the generation of the acoustic signal at a first time. During the close proximity indication zone window, a signal is received from the acoustic transducer. When the signal is received, an obstacle is detected in the close proximity indication zone if the magnitude of a first pulse received from the transducer at a second time is less than a first threshold but greater than a second threshold for a debounce time. Additionally, a magnitude of a second pulse received from the transducer outside the close proximity indication zone window at a third time should be less than the second threshold but greater than a third threshold for the debounce time. In this form, the third time is equal to the first time plus two times the difference between the second time and the first time.

15 Claims, 9 Drawing Sheets

(51) Int. Cl.
   *G01S 7/527*    (2006.01)
   *G01S 15/18*    (2006.01)
   *G01S 15/87*    (2006.01)
   *H04B 1/00*     (2006.01)

(52) U.S. Cl.
   CPC ...... *G01S 2015/938* (2013.01); *H04B 1/0042* (2013.01)

(56) References Cited

U.S. PATENT DOCUMENTS

| | | | | |
|---|---|---|---|---|
| 4,264,788 | A * | 4/1981 | Keidel | G01F 23/2968 310/327 |
| 4,864,136 | A * | 9/1989 | Behlke | G08B 13/191 250/338.3 |
| 5,207,101 | A * | 5/1993 | Haynes | G01F 23/2962 73/290 V |
| 5,277,065 | A * | 1/1994 | Leszczynski | G01F 23/2962 367/903 |
| 5,991,234 | A * | 11/1999 | Sejalon | B06B 1/0246 367/13 |
| 6,173,233 | B1 * | 1/2001 | Janutka | G01S 7/523 340/436 |
| 6,462,657 | B1 * | 10/2002 | Perski | B60R 25/1009 340/426.1 |
| 6,573,732 | B1 | 6/2003 | Reimer | |
| 7,957,223 | B2 | 6/2011 | Hafer et al. | |
| 2002/0105417 | A1 * | 8/2002 | Gillis | B60R 25/1009 340/426.1 |
| 2003/0039171 | A1 * | 2/2003 | Chiapetta | B62D 61/10 367/98 |
| 2004/0202049 | A1 * | 10/2004 | Breed | B06B 1/0215 367/138 |
| 2006/0192669 | A1 * | 8/2006 | Allen | B60R 25/1009 340/522 |
| 2008/0018461 | A1 * | 1/2008 | Reymond | G08B 13/1672 340/541 |
| 2011/0087342 | A1 | 4/2011 | Liao et al. | |
| 2013/0235700 | A1 | 9/2013 | Koudar | |
| 2014/0204700 | A1 * | 7/2014 | Valero | G01S 15/006 367/7 |
| 2014/0236533 | A1 * | 8/2014 | Drachmann | G01F 1/667 702/176 |
| 2017/0123055 | A1 * | 5/2017 | Hustava | G01S 15/931 |
| 2017/0284969 | A1 * | 10/2017 | Bauer | G01N 29/024 |

* cited by examiner

CIRCUIT FOR ACOUSTIC DISTANCE MEASURING

CROSS REFERENCE TO RELATED APPLICATIONS

This application claims priority to U.S. Provisional Application No. 62/249,701, filed on Nov. 2, 2015, entitled "PROXIMITY ZONE DETECTION," invented by Marek Hustava, Tomas Pikula and Tomas Suchy.

FIELD OF THE DISCLOSURE

The present disclosure relates generally to electrical and electronic circuits, and more particularly to acoustic distance measuring systems.

BACKGROUND

Acoustic measuring systems and distance measuring systems are utilized in a variety of applications. For example, acoustic measuring systems are utilized to measure obstacle distance in applications ranging from automotive systems to fossil discovery. Acoustic measuring systems generally operate by first transmitting a pulse of acoustic energy, creating a sound wave. Then a measurement of the time of flight of the sound wave is recorded. The time of flight, which is the time from transmission of the sound wave until a reflection of the sound wave is received, determines the distance of the obstacle. Automotive applications that utilize acoustic measuring systems require reliable detection of the presence of an obstacle. Currently, the reliable detection of obstacles may be opposed by obstacles positioned in the blind spot of a detection device, as well as extreme electrical noise causing false obstacle detection.

Acoustic measuring systems often utilize acoustic transducers both to transmit the generated sound wave, and to receive the reflected signal, or echo signal. These systems may have a certain distance within which an obstacle cannot be detected. A lower minimal distance required for detection of an obstacle results in more accurately detected objects, thereby resulting in higher automotive safety. Current acoustic measuring systems are also highly susceptible to extreme electrical noise, which is one factor in creating false object detection signals. As electromagnetic compatibility (EMC) requirements change, higher levels of electrical noise in allowed frequencies are unavoidable and may interrupt accurate acoustic distance detection. False object detection or missed object detection could be detrimental in automotive and other acoustic measuring applications. Therefore, avoiding false-positive object detection and false-negative object detection is important to insure proper acoustic measuring system functionality and reliability.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

For simplicity and clarity of the illustration, elements in the figures are not necessarily to scale, are only schematic, and are non-limiting. Additionally, descriptions and details of well-known steps and elements are omitted for simplicity of the description. It will be appreciated by those skilled in the art that the words "during", "while", and "when" as used herein relating to circuit operation are not exact terms that mean an action takes place instantly upon an initiating action but that there may be some small but reasonable delay, such as a propagation delay, between the reaction that is initiated by the initial action. Additionally, the term "while" means that a certain action occurs at least within some portion of a duration of the initiating action. The use of the word "approximately" or "substantially" means that a value of an element has a parameter that is expected to be close to a stated value or position. However, as is well known in the art there may be minor variances that may prevent the values or positions from being exactly as stated.

Figure 1:
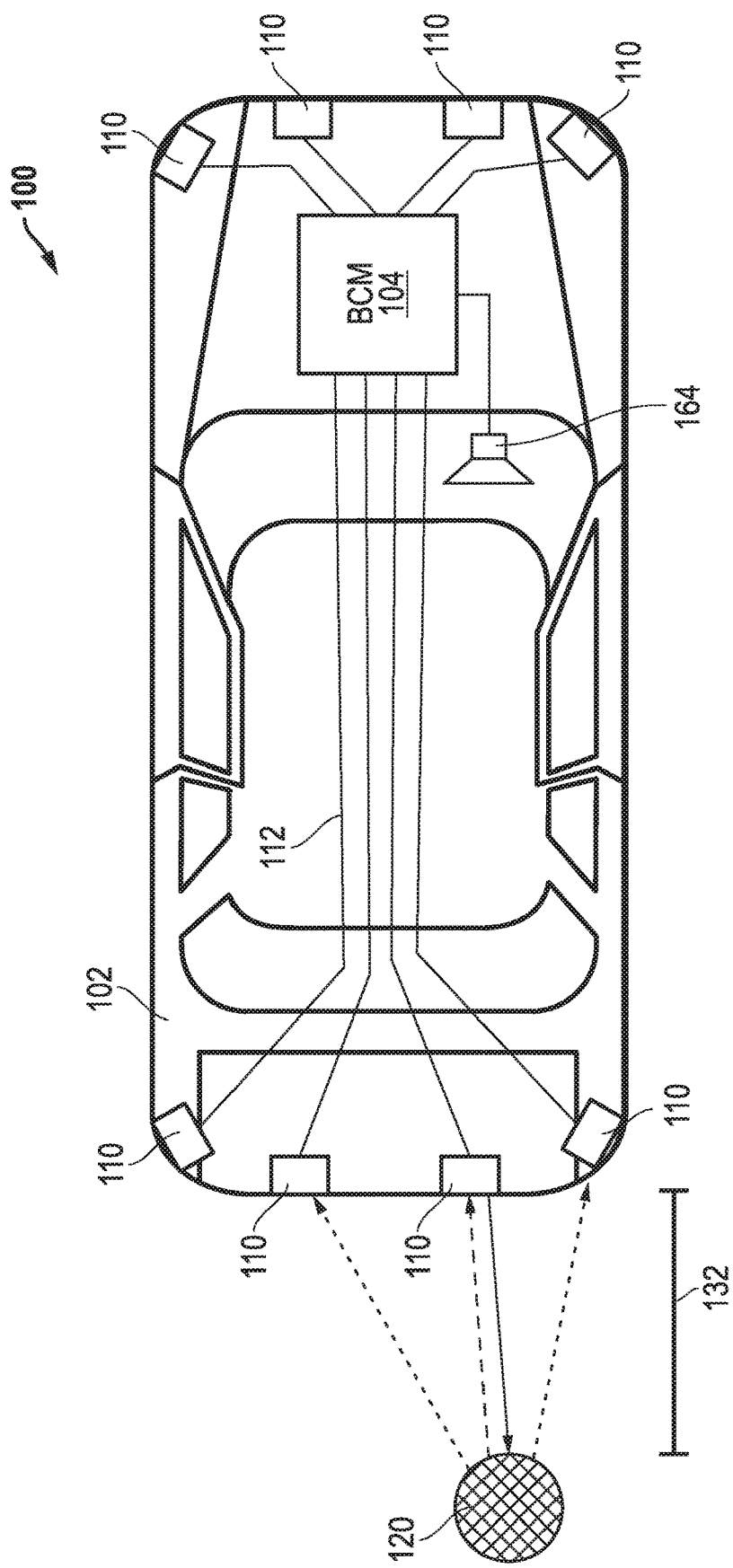
FIG. 1 illustrates in block diagram form an acoustic distance measuring system according to one embodiment.

FIG. 1 illustrates in block diagram form an acoustic distance measuring system 100 according to one embodiment. Acoustic distance measuring system 100 in FIG. 1 includes an automotive device 102, a body controller module (BCM) 104 (or electronic control circuit), a loudspeaker 164, a set of transmission lines 112, a set of sensors 110, and an obstacle 120. A system controller, such as BCM 104, is situated on or within automotive device 102, and provides an electrical signal corresponding to an audible output to loudspeaker 164.

Automotive device 102 is communicatively connected to BCM 104. BCM 104 has an output for connecting to one or more acoustic transducers, such as sensors 110. BCM 104 has an input also connected to each of sensors 110. Additionally, BCM 104 has an output for providing an output signal to loudspeaker 164. Each of sensors 110 is capable of creating an acoustic signal, and sensing a first and second reflected audio signal when obstacle 120 is encountered.

In the illustrated embodiment, BCM 104 generates an acoustic signal for sensors 110 at a first time. Sensors 110 are susceptible to reverberations that define a close proximity indication zone, as indicated by proximity indication zone 132. BCM 104 transmits signals to sensors 110, via transmission lines 112, and responsively, sensors 110 output acoustic signals. The acoustic signal generated by sensor 110 travels away from sensor 110 and propagates through air. When BCM 104 stops transmission of the signal, sensors 110 begin to reverberate. The reverberation has an exponentially decaying magnitude. BCM 104 monitors sensors 110 for echo signals that may be caused by interruptions to the propagating acoustic signal. When obstacle 120 is within the proximity indication zone, BCM 104 receives an echo from at least one of sensors 110 and relays a request to output an audible signal to loudspeaker 164 signifying the presence of an obstacle within the proximity indication zone. Reliable detection for obstacles moving in and out of blind zones, as well as proximity indication zones under severe noise conditions, is needed. Avoiding false proximity indication zone detection due to the presence of electrical noise is an important characteristic. Acoustic distance measuring system 100 compensates for these problems as described further.

Figure 2:
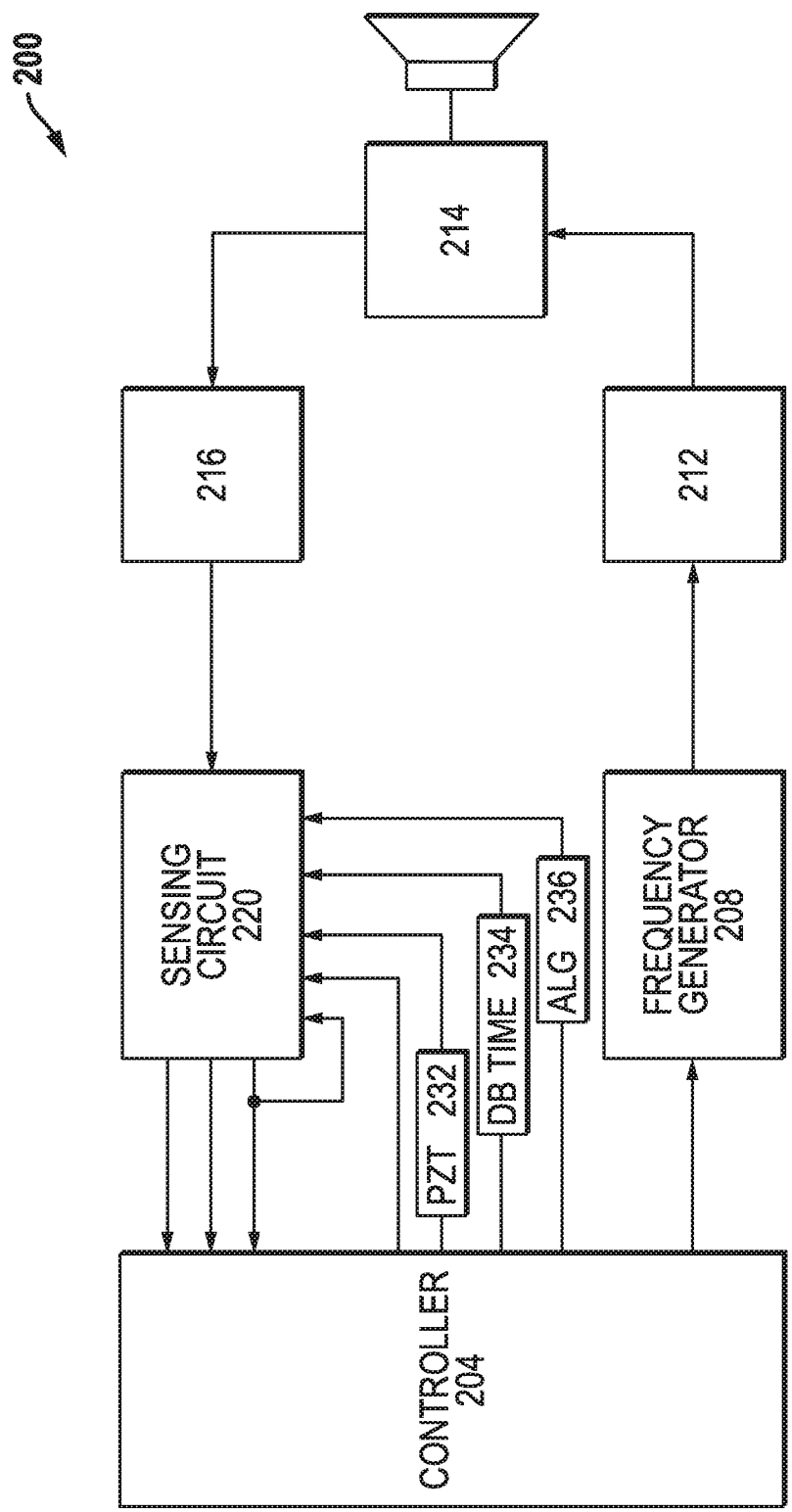
FIG. 2 illustrates in block diagram form an acoustic distance measuring circuit for use in the acoustic distance measuring system of FIG. 1.

FIG. 2 illustrates in block diagram form an acoustic distance measuring circuit 200 for use in the acoustic distance measuring system of FIG. 1. Acoustic distance measuring circuit 200 includes a controller 204, a frequency generator 208, a transmitter amplifier 212, an acoustic transducer 214, a receiver amplifier 216, and a sensing circuit 220.

Controller 204, similar to BCM 104, is connected to frequency generator 208. A control signal is output to frequency generator 208 from controller 204. Additionally, controller 204 has output terminals for outputting a ring time signal, a value for a proximity indication zone threshold 232, a proximity indication zone debounce time 234, and a proximity algorithm 236. Controller 204 has input terminals for receiving a signal for a close proximity indication zone flag signal, a valid proximity indication zone flag signal, and a potential proximity indication zone flag signal. Controller 204 may be, for example, a body controller module, an electronic control unit, or a control system that operates the acoustic distance measuring system of FIG. 1. Controller 204 operates acoustic distance measuring system of FIG. 1 by outputting the control signal to frequency generator 208, as well as by receiving real-time and predetermined signals for algorithms and variables to be utilized in processing echo signals received by acoustic distance measuring system 100 of FIG. 1.

Frequency generator 208 has an input terminal for receiving the control signal, and an output terminal, connected to transmitter amplifier 212, for transmitting a generated acoustic signal. The acoustic signal generated may be an ultrasonic frequency signal.

Transmitter amplifier 212 has an input for receiving the acoustic signal from frequency generator 208. The output of transmitter amplifier 212, connected to acoustic transducer 214, is for providing an amplified acoustic signal to acoustic transducer 214.

Acoustic transducer 214 has an input terminal for receiving an acoustic signal. Additionally, acoustic transducer 214 has an output terminal adapted to transmit a received echo signal. Acoustic transducer 214 may be, for example, a piezoelectric sensor.

Receiver amplifier 216 has an input for connecting to acoustic transducer 214 and an output. The output of receiver amplifier 216, connected to sensing circuit 220, transmits the received signal. In one embodiment, sensing circuit 220 supports temperature tracking and acoustic transducer ring time look up and has an input connected to the output of receiver amplifier 216 and an output for providing the ring time signal that measures a current temperature and the varying ring time signal in response to an estimated effect of the current temperature on a reverberation time of acoustic transducer 214.

Sensing circuit 220 has an input connected to the output of receiver amplifier 216, and an output for providing the close proximity indication flag signal, proximity indication zone flag signal, and potential proximity indication zone flag signal. Sensing circuit 220 additionally has inputs for receiving the ring time signal, the value for proximity indication zone threshold 232, proximity indication zone debounce time 234, proximity algorithm 236, as well as for receiving a feedback for the close proximity indication flag signal. The close proximity indication flag signal defines a start and an end of a close proximity indication zone window. The indication zone flag signal is for defining a start and an end of a proximity indication zone window in response to receiving the ring time signal, and detects an obstacle in the proximity indication zone with respect to the provided parameters. The potential proximity indication zone flag signal is output in response to detecting an obstacle positioned up to approximately twice the distance of the defined proximity indication zone window. In one embodiment, the close proximity indication flag signal provides the close proximity indication zone null feedback flag signal when a reflected signal is detected in a valid distance measurement zone (discussed further with FIG. 4).

In operation, controller 204 provides the control signal to frequency generator 208. Frequency generator 208 generates an acoustic frequency signal and provides the generated signal to transmitter amplifier 212 as an electrical signal, at a first time. The start of the close proximity indication zone window is defined after the acoustic signal is generated. Transmitter amplifier 212 amplifies the power of the signal generated by frequency generator 208 and provides the acoustic frequency signal to acoustic transducer 214. When transmitter amplifier 212 is not available, the signal is provided to acoustic transducer 214. Acoustic transducer 214 vibrates and generates a signal that corresponds to the input signal provided. Acoustic transducer 214 is susceptible to reverberation that defines a close proximity indication zone. The acoustic signal generated by acoustic transducer 214 vibrates and travels away from acoustic transducer 214. Receiver amplifier 216 monitors acoustic transducer 214 for echo signals, amplifies received echo signals, then transmits the echo signals to sensing circuit 220. Sensing circuit 220 utilizes the received signal in addition to the inputs of the ring time signal, the value for proximity indication zone threshold 232, proximity indication zone debounce time 234, and proximity algorithm 236 to detect obstacle presence. The close proximity indication zone flag signal, the valid proximity indication zone flag signal, and potential proximity indication zone flag signal are provided to controller 204. The close proximity indication zone flag signal, the valid proximity indication zone flag signal, and the potential proximity indication zone flag signal are utilized by controller 204 to correlate object and/or obstacle proximity within a proximity indication zone window.

In one embodiment the proximity indication zone flag signal enables detection of an obstacle in the proximity indication zone utilizing a first proximity indication zone algorithm. The proximity indication zone flag signal defines a start and an end of the proximity indication zone window in response to receipt of the ring time signal. When a magnitude of a pulse received from receiver amplifier 216 within the proximity indication zone window is greater than the predetermined value for proximity indication zone threshold 232 for the defined proximity indication zone debounce time 234, an obstacle is detected.

In another embodiment, sensing circuit 220 utilizes a second proximity algorithm for providing a close proximity indication flag signal that is output in association with the detection of an obstacle. An obstacle, at a first time, is detected in the close proximity indication zone given one or more conditions. A first condition provides a magnitude of a first pulse received from acoustic transducer 214 in the close proximity indication zone window, at a second time, is less than a first proximity indication zone threshold, but greater than a second proximity indication zone threshold for the associated proximity indication zone debounce time 234. Additionally, a magnitude of a second pulse received from acoustic transducer 214 outside the close proximity indication zone window at a third time is less than the second proximity indication zone threshold but greater than a third proximity indication zone threshold for the associated proximity indication zone debounce time 234. The third time, as provided by the condition, is equal to one and one-half of a difference between the second time and the first time. When these conditions are detected, the close proximity indication flag signal is output in response to detecting the obstacle in the close proximity indication zone.

Sensing circuit 220 of acoustic distance measuring circuit 200 provides an additional proximity indication output. In one embodiment, sensing circuit 220 outputs the potential proximity indication zone flag signal when the close proximity indication zone null feedback flag signal is received at sensing circuit 220. The close proximity indication zone null feedback flag signal verifies that an obstacle in close proximity is detected first. The potential proximity indication zone flag signal is output in response to detecting an obstacle at a fourth time equal to twice and end of reverberation time of acoustic transducer 214. Additionally, the magnitude of a third pulse at the fourth time should be greater than proximity indication zone threshold 232 for a second debounce time, as determined by proximity indication zone debounce time 234, thereby enabling the output of the potential proximity indication zone flag signal.

Figure 3:
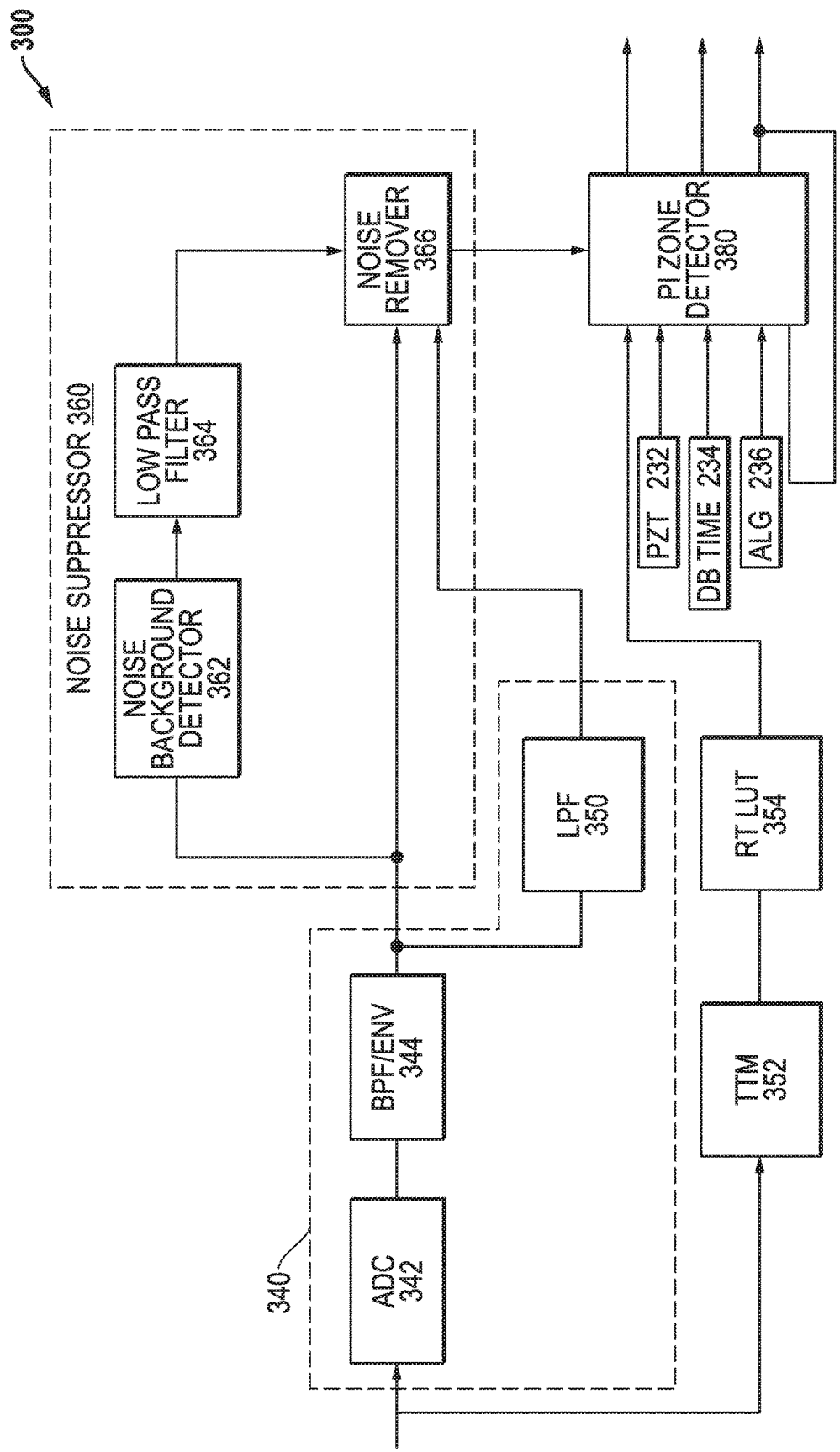
FIG. 3 illustrates in block diagram form the sensing circuit of FIG. 2.

FIG. 3 illustrates in block diagram form sensing circuit 300 that can be used as sensing circuit 220 of FIG. 2. Sensing circuit 300 includes generally a proximity signal filter circuit 340, temperature tracking measurement (TTM) circuit 352, ring time look up table (RT LUT) 354, noise suppressor circuit 360, and proximity indication zone detector 380.

Proximity signal filter circuit 340 includes an analog-to-digital convertor (ADC) 342, a bandpass filter and envelope detector (BPF/ENV) 344, and a first low pass filter (LPF) 350. Analog-to-digital converter 340 has an input connected to the output of a receiver amplifier (for example, receiver amplifier 216 of FIG. 2) for receiving an input signal, and an output. BPF/ENV 344 has an input connected to the output of analog to digital converter 342, and an output for providing an envelope of the received input signal. Low pass filter 350 has an input connected to the output of BPF/ENV 344, and an output for providing a floating average signal. BPF/ENV 344 is a high-Q digital signal processing filter for narrow passband processing of the received input signal combined with an envelope detector that generates an output that is the envelope of the received input signal.

Temperature tracking measurement circuit 352 works in conjunction with ring time look up table 354. Temperature tracking measurement circuit 352 has an input connected to the output of receiver amplifier 216 (of FIG. 2) and an output for providing a ring time signal, via ring time look up table 354. Temperature tracking measurement circuit 352 enables tracking of a current temperature, and varies the ring time signal provided by ring time look up table 354 in response to an estimated effect of the current temperature on a reverberation time of acoustic transducer 214 (of FIG. 2).

Noise suppressor circuit 360 includes a noise background detector 362, a low pass filter 364, and a noise remover 366. Noise suppressor circuit 360 has first and second inputs respectively connected to the first and second outputs of proximity signal filter circuit 340, and an output for providing a filtered, noise suppressed envelope of the input signal, or filtered envelope signal. Noise background detector 362 has an input connected to the output of BPF/ENV 344, and an output. A second low pass filter, low pass filter 364, has an input connected to the output of noise background detector 362, and an output for providing an average noise level signal. Noise remover 366 has a first input connected to the output of low pass filter 364, a second input connected to the output of BPF/ENV 344, a third input connected to the output of low pass filter 350, and an output for providing a filtered envelope signal.

Proximity indication zone detector 380 includes an input connected to the output of noise remover 366 of noise suppressor circuit 360, and an output for providing a close proximity indication flag signal, a proximity indication zone flag signal, and a potential proximity indication zone flag signal. Additionally, proximity indication zone detector 380 has inputs for receiving the inputs of the ring time signal from ring time look up table 354, a close proximity indication zone null feedback flag signal, a proximity indication zone threshold 232, a proximity indication zone debounce time 234, and a proximity algorithm 236 to detect obstacle presence.

In operation, sensing circuit 300 receives an input signal, where the input signal includes the pulse received from receiver amplifier 216 (of FIG. 2) resulting from reverberations provided by acoustic transducer 214 (of FIG. 2) as well as echoes produced by reflections off physical objects. Sensing circuit 300 enables filtering of the signal received from acoustic transducer 214, and enables output corresponding to distance of an obstacle with respect to the acoustic transducer. Temperature tracking measurement circuit 352 receives the input signal and utilizes the input signal along with the current temperature measurement to vary the ring time signal in response to the estimated effect of the current temperature on the reverberation time period of acoustic transducer 214 (of FIG. 2). The start and end of the proximity indication zone window is defined based on the input response of the ring time signal. Analog-to-digital convertor 342 digitizes the input signal received. BPF/ENV 344 receives the digitized input signal and provides the envelope of the input signal to low pass filter 350, noise background detector 362, and noise remover 366. Low pass filter 350 provides a floating average signal of the envelope of the input signal to noise remover 366.

Noise background detector 362 detects the background noise within the envelope of the input signal received. The envelope of the input signal received is then processed via low pass filter 364. Low pass filter 364 provides the averaged noise level signal to noise remover 366. Noise remover 366 processes the floating average signal, the envelope of input signal, and the average noise level signal to provide the noise suppressed envelope of the input signal, or filtered envelope signal, to proximity indication zone detector 380.

Proximity indication zone detector 380 receives the ring time signal for defining the start and end of the proximity window. Proximity indication zone threshold 232 is provided to proximity indication zone detector 380 as a predetermined value for defining detection parameters with respect to proximity indication zone debounce time 234. Proximity algorithm 236 provides the ability to detect an obstacle using either or both of a first algorithm and a second algorithm. The first algorithm determines the presence of an obstacle when the magnitude of the input signal is above proximity indication zone threshold 232 following a defined debounce period. The second algorithm determines the presence of an obstacle when the input signal is above proximity indication zone threshold 232 for a defined period and the close proximity indication zone null feedback flag signal has not reported an obstacle in close proximity (when close proximity indication zone null feedback flag signal equals one, an obstacle is reported as being in close proximity). Proximity indication zone detector 380 enables output of one or more of: the close proximity indication flag signal, proximity indication zone flag signal, and potential proximity indication zone flag signal to be output in response to detecting an obstacle in a proximity indication zone window according to the filtered envelope signal.

For example, assume there is an obstacle inside the close proximity indication zone window at a given distance from acoustic transducer 214. Sensing circuit 220 cannot detect the obstacle directly because the first echo interferes with the reverberation of acoustic transducer 214. However, in response to the emitted acoustic signal, the obstacle will produce a decaying series of echoes of the acoustic signal at integer multiples of the distance of the obstacle from acoustic transducer 214. Sensing circuit 220 detects a possible second echo outside the close proximity indication zone window when the received signal has a magnitude less than a first threshold (used for direct detection of the obstacle outside of the close proximity indication zone window) but greater than a second threshold for longer than the debounce time. The distance between acoustic transducer 214 and this second echo determines when a potential third echo would be expected, namely at one and one-half times the distance of the second echo (equivalent to three times the distance of the first echo) from acoustic transducer 214. If the received signal has a magnitude less than the second threshold but greater than a third threshold at this distance for more than the debounce time, then sensing circuit 220 detects the presence of an obstacle at a distance equal to one-half of the distance of the first echo.

Figure 4:
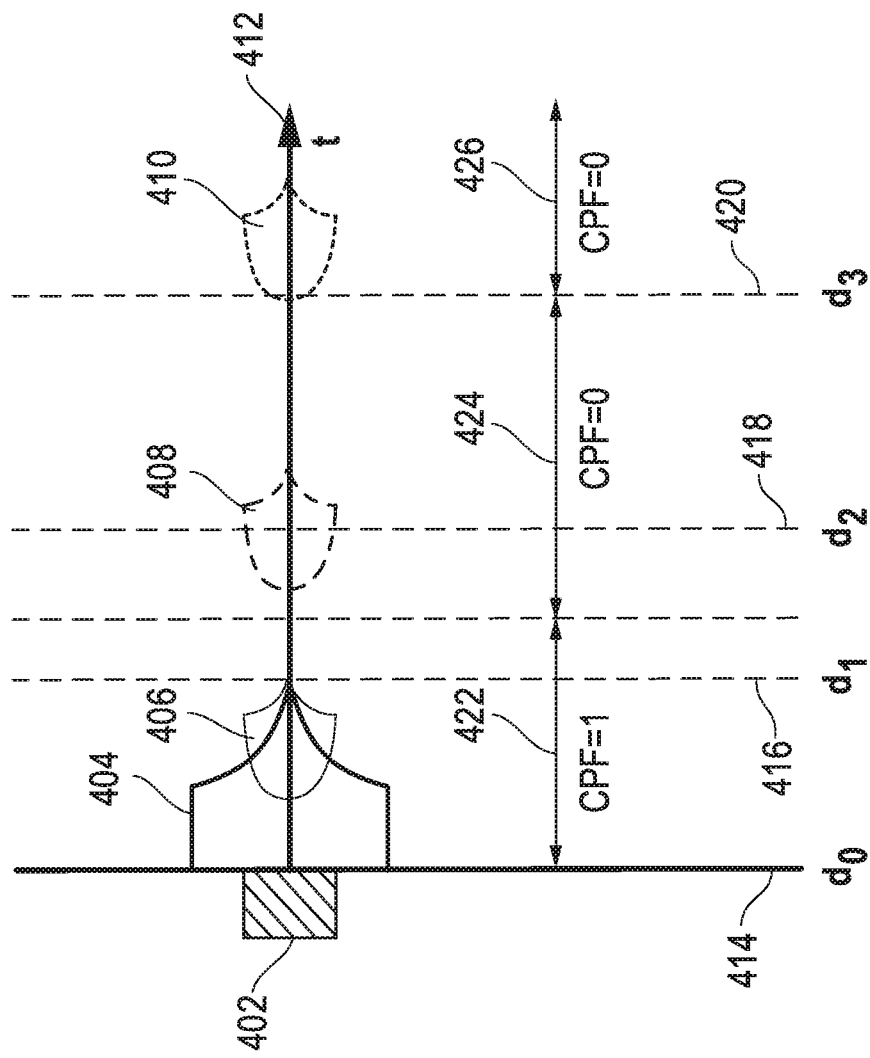
FIG. 4 illustrates a timing diagram depicting acoustic signals received by the acoustic distance measuring system according to an embodiment.

FIG. 4 illustrates timing diagram 430, depicting acoustic signals received by acoustic distance measuring circuit 200 of FIG. 2. Within timing diagram 430 time is represented on a time axis 412 and signal magnitude is represented on a vertical axis 414. Distances 416, 418, and 420 correspond to respective times on time axis 412. A close proximity indication zone window 422, a proximity indication zone window 424, and a potential proximity indication zone window 426 represent potential object distance measurements. Timing diagram 430 also includes a reverberation 404, a reflection 406, a reflection 408, and a reflection 410. A sensor, such as acoustic transducer 214, is represented by sensor 402.

In timing diagram 430 three potential object distances are represented: reflection 406, reflection 408, and reflection 410. One of a first proximity zone algorithm or a second proximity zone algorithm is applied to the signals by proximity indication zone detector 380 (FIG. 3), to detect the presence of an object within the potential object distances. The first algorithm determines the presence of an object when the magnitude of the input signal is above a predetermined proximity threshold following a defined debounce period. The second algorithm determines the presence of an object when input signal is above a predetermined proximity threshold for a defined debounce period and the close proximity zone null feedback flag signal has not reported an object in close proximity (when the close proximity zone null feedback flag signal equals one, an obstacle is reported as being in close proximity to the acoustic transducer).

A start of close proximity indication zone window 422 is defined by the start of reverberation 404 at distance zero (do). The end of close proximity indication zone window 422 is defined by the response of the input ring time signal provided by ring time look up table 354 (FIG. 3). Reflection 406 is partially masked by reverberation 404 within close proximity indication zone window 422. In this embodiment, the close proximity null feedback flag signal equals one, identifying that an obstacle is positioned in close proximity to sensor 402. When the close proximity zone flag equals one, a first proximity algorithm is applied to detect the obstacle presence within close proximity indication zone window 422. Reflection 408 is received indicating an object is detected at distance 418 at a second time. When there is no detected reflection inside close proximity indication zone window 422, the close proximity null feedback flag signal equals zero, and second proximity algorithm is applied to determine the presence of an obstacle outside close proximity indication zone window 422, for example, within proximity indication zone window 424. Reflection 410 is detected at distance 420 at a third time. When there are no detected reflections inside close proximity indication zone window 422, close proximity null feedback flag signal equals zero, and proximity algorithm two is applied to determine the presence of an obstacle at an additional zone outside close proximity indication zone window 422, for example, within potential proximity indication zone window 426.

In one embodiment, a start and end of the close proximity zone window are defined. Reflection 406 is received by sensor 402 and a corresponding signal is transmitted to a controller, such as BCM 104 (of FIG. 1). BCM 104 receives a signal from sensor 402 within close proximity indication zone window 422 corresponding to the obstacle presence relative to the sensor. In this embodiment the signal indicates the presence of an obstacle. In response to detection of an object, such as obstacle 120 (FIG. 1) within close proximity indication zone window 422, BCM 104 enables output of a signal indicating the presence of an obstacle in close proximity indication zone window 422. BCM 104 may enable output of an audible signal to loudspeaker 164 (of FIG. 1).

In one example, as automotive device 102 of FIG. 1 moves closer to an object, or vise versa, the arrival time of reflection 408 and reflection 410 decreases. BCM 104 receives signals from sensor 402 in response to detecting one or more objects within proximity indication zone window 424 and potential proximity indication zone window 426. In this embodiment, a proximity indication flag signal and a potential proximity indication flag signal are output by the controller.

FIGS. 5-8 illustrate timing diagrams 500, 600, 700, and 800, respectively, depicting acoustic signals received based on obstacle detection. Timing diagrams 500, 530, 550, and 570 show simulated acoustic signals. Distance with respect to time is represented on an x-axis 528, and signal magnitude is represented on a y-axis 512. Distances 514, 516, and 518 correspond to respective times on x-axis 528. Additionally, a threshold 520, a threshold 522, and a threshold 524 are represented along x-axis 528.

Threshold 520 represents a sufficient magnitude after the end of the reverberation time period to indicate the presence of an obstacle outside of the close proximity indication zone. Threshold 522 represents a sufficient magnitude after the end of the reverberation time period to indicate the presence of the second echo of an obstacle inside of the close proximity indication zone. Threshold 524 represents a sufficient magnitude after the end of the reverberation time period to indicate the presence of the third echo of an obstacle inside of the close proximity indication zone. Threshold 520, 522, and 524 are predetermined and/or programmable values.

Distance 514 corresponds to the beginning of the close proximity indication zone window. The start and end of proximity indication zone window 526 is defined based on the input response of the ring time signal. Distance 516 corresponds to twice the distance of distance 514, and distance 518 corresponds to three times the distance of distance 514.

Figure 5:
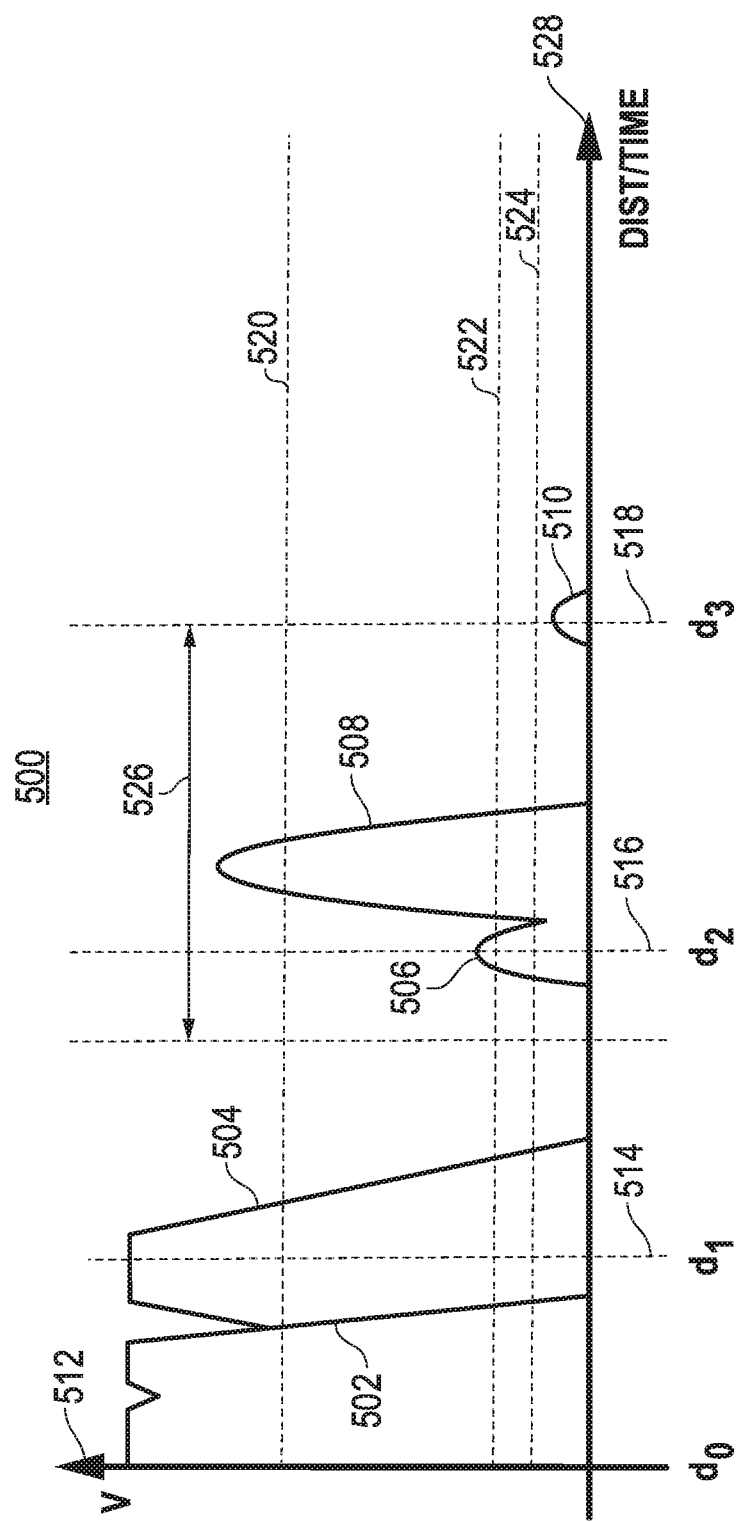
FIG. 5 illustrates a timing diagram depicting acoustic signals received based on obstacle detection according to an embodiment.

FIG. 5 includes reverberation 502, reflection 504, reflection 506, reflection 508, and reflection 510. Reverberation 502 simulates a phase shift at the end of the transmission of the acoustic signal. Proximity indication zone window 526 begins at distance 516. Reflection 506 is positioned within the close proximity indication zone window. Reflection 508 is positioned within proximity indication zone window 526. Reflection 510 is positioned at distance 518.

In one example, the acoustic signal is generated by the sensor and propagates through air. When transmission of the signal ceases, the sensors begin to reverberate. The controller receives the reverberation signals and monitors the sensors for echo signals that may be caused by interruptions to the propagating acoustic signal from obstacles within and/or near the proximity indication zone. Each of the reverberation signals and detected echoes are utilized within the signal analysis of sensing circuit 300. As simulated, reverberation 502 displays a phase shift at the end of the transmission of the acoustic signal, and reflection 504 is partially masked by reverberation 502 at less than the predetermined debounce time. In this example, the magnitude of reflection 506 received at distance 516 by the receiver amplifier is greater than threshold 522 for the predetermined debounce time. The magnitude of reflection 508 received by the receiver amplifier is greater than threshold 520, for the predetermined debounce time. The close proximity null feedback flag signal equals one, identifying that an obstacle is potentially positioned in close proximity to the sensor. When the close proximity indication zone flag signal equals one, a first proximity algorithm is applied to detect the obstacle presence within the close proximity indication zone window. Reflection 808 is also received indicating an obstacle is detected at a second distance, distance 516. Reflection 510, located at distance 518 is a third reflection of the obstacle in the close proximity indication zone. In response to detection of reflection 506 sensing circuit 300 (of FIG. 3) outputs the close proximity indication flag signal. Sensing circuit 300 may also output the proximity indication zone flag signal in response to reflection 508 corresponding to an obstacle detected in proximity indication zone window 526.

Figure 6:
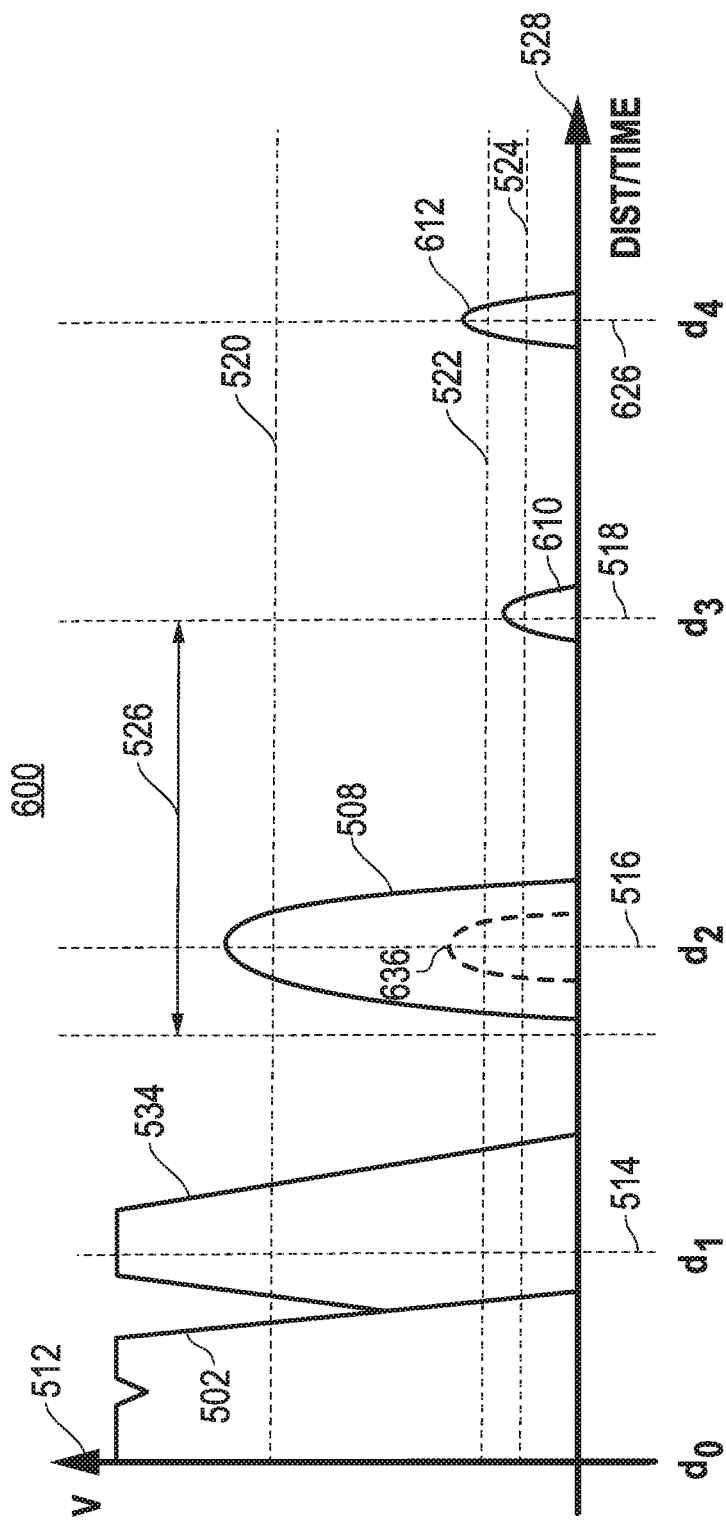
FIG. 6 illustrates a timing diagram depicting acoustic signals received based on obstacle detection according to an embodiment.

FIG. 6 includes reverberation 502, reflection 534, reflection 508, a reflection 636, a reflection 610, and a reflection 612 within timing diagram 600. Timing diagram 600 additionally includes a distance 626, which corresponds to twice the distance of distance 516. Reflection 506 simulates a phase shift at the end of the transmission of the acoustic signal. Reflection 508 corresponds to an obstacle that can be reflected directly utilizing algorithm one within the sensing circuit. Reflection 534 simulates an echo that interferes with reverberation 502. In this example, since there is an obstacle inside the close proximity indication zone window at a given distance from the acoustic transducer the sensing circuit cannot detect the obstacle directly because the first echo interferes with the reverberation signal of the acoustic transducer. However, in response to the emitted acoustic signal, the obstacle at distance 514 produces a decaying series of echoes of the acoustic signal at distance 516 and distance 518 produced by the presence of the obstacle at distance 514. The second algorithm is applied by the sensing circuit because an obstacle has not been detected in the close proximity indication zone due to reflection 534 being partially masked by reverberation 502. Timing diagram shows that the sensing circuit detects a possible second echo, reflection 636, at distance 516, when the received signal has a magnitude less than a first threshold, but greater than a second threshold for longer than the debounce time, however, reflection 636 is masked by the reflection of a second obstacle at distance 516. Accordingly, a third echo, reflection 610 is received at three times the distance of the first echo from the acoustic transducer. As determined by the algorithm, the detected echo at distance 518 has a magnitude less than threshold 522, but greater than threshold 524 for more than the debounce time, therefore the sensing circuit determines the presence of an obstacle at a distance equal to one-half of distance 514. Additionally, reflection 612, positioned at twice the distance of distance 516 is a second reflection of the obstacle positioned at distance 518. In response to detection of reflection 610 and reflection 508 sensing circuit 300 outputs the close proximity indication flag signal and the proximity indication zone flag signal.

Figure 7:
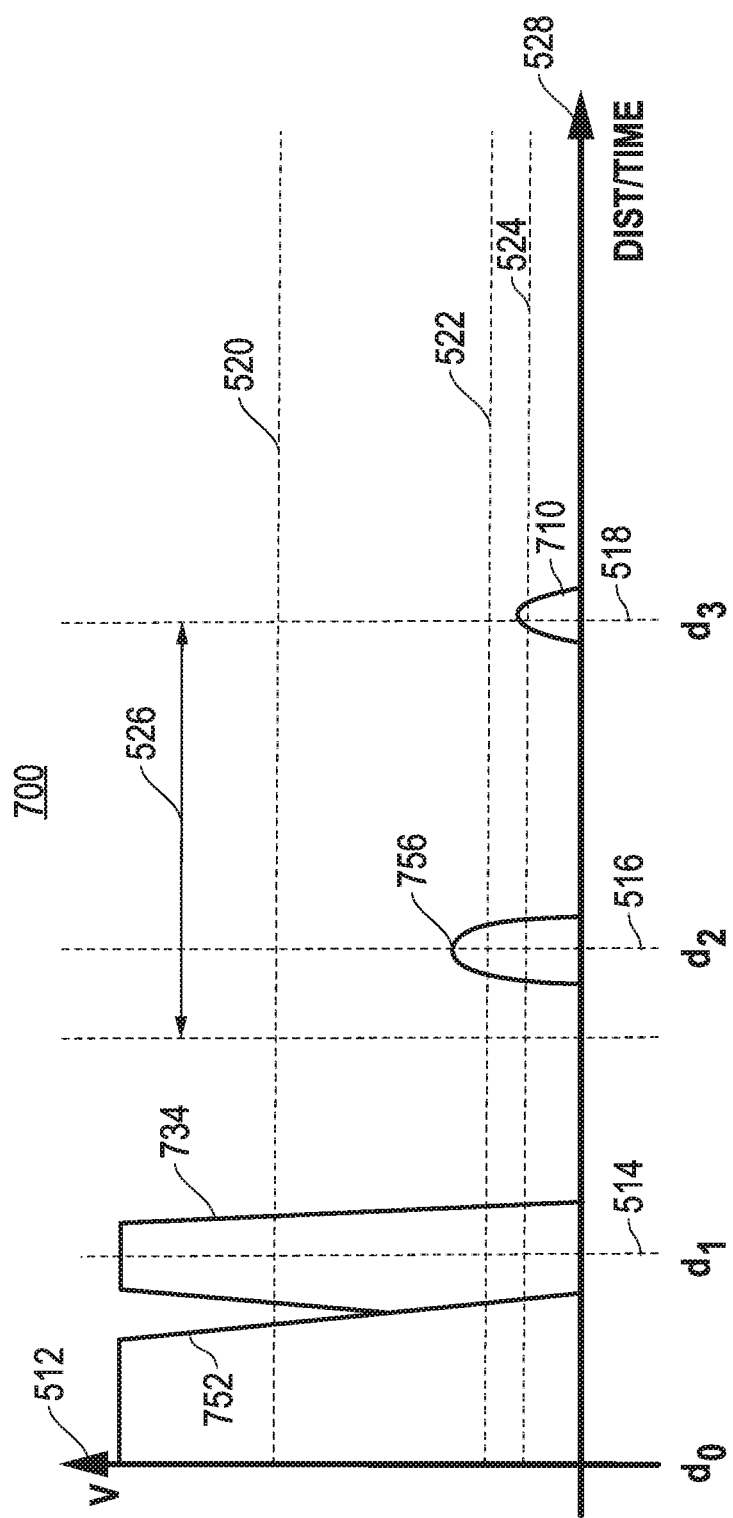
FIG. 7 illustrates a timing diagram depicting acoustic signals received based on obstacle detection according to an embodiment.

FIG. 7 includes a reverberation 752, a reflection 734, a reflection 756, and a reflection 710. Reflection 734 simulates an echo interfering with the reverberation. Reflection 756 is a second reflection detected at distance 516 above threshold 522. Reflection 710 is a third reflection from the obstacle, and is detected above threshold 524 at distance 518.

In the example of timing diagram 700, as simulated, a first reverberation is received, reverberation 752. Reflection 734 simulates an echo that interferes with reverberation 752. Reflection 756, with a magnitude below threshold 520, detected at distance 516, indicates the reflection is a second pulse of an obstacle that has been detected within the close proximity indication zone. Reflection 710 positioned at distance 518, above threshold 524 and below threshold 522, is the third reflection of the obstacle positioned in the close proximity indication zone and indicates an obstacle is detected at distance 514. In response to an obstacle being detected within the close proximity indication zone window the proximity indication zone detector outputs the close proximity indication flag signal.

Figure 8:
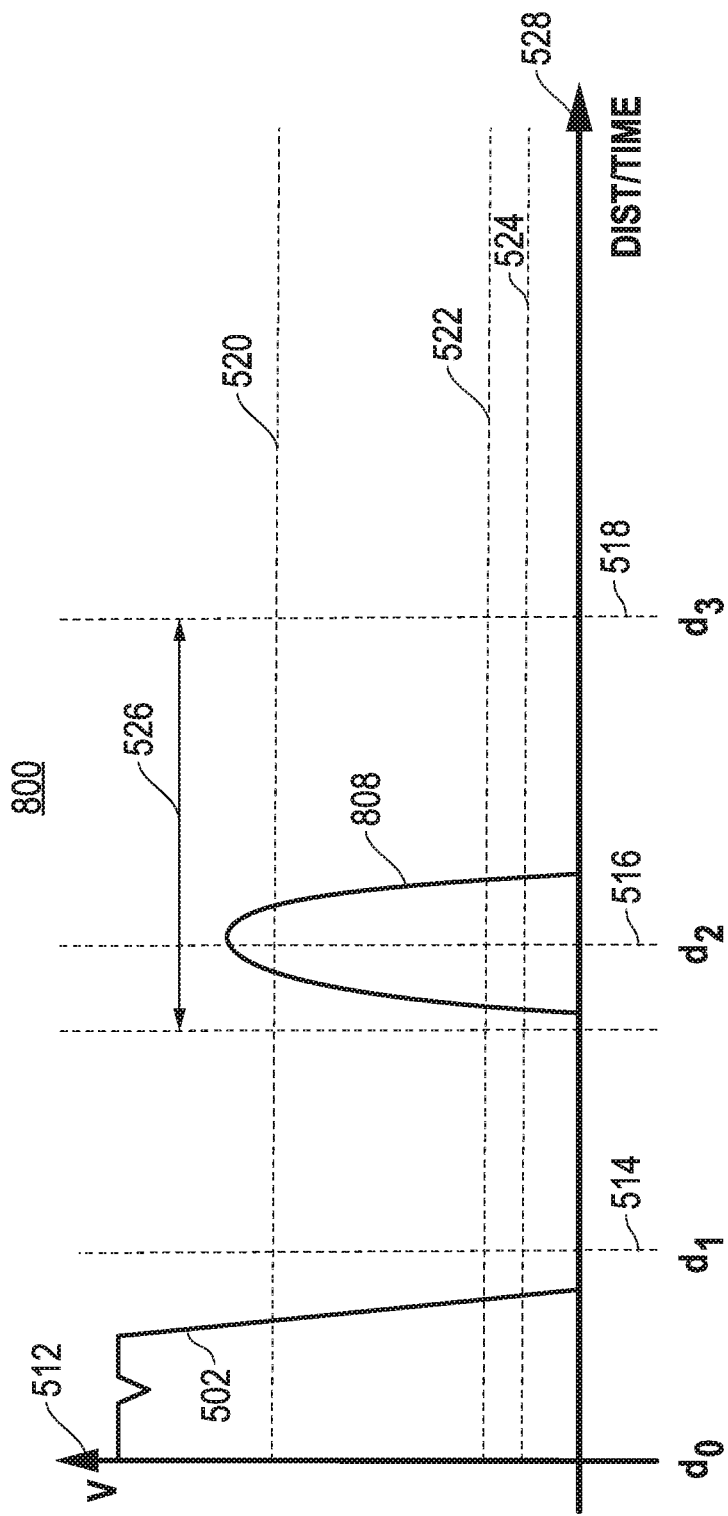
FIG. 8 illustrates a timing diagram depicting an acoustic signal received by the acoustic distance measuring system according to an embodiment.

FIG. 8 includes reverberation 502 and reflection 808. In one embodiment, reverberation 502 simulates a phase shift at the end of the transmission of the acoustic signal. There is no reflection detected within the close proximity indication zone. The magnitude of reflection 808 is above threshold 520. In this example, algorithm one is applied. An obstacle is detected in the proximity indication zone because the magnitude of the pulse, reflection 808, received from the receiver amplifier (216) in proximity indication zone window 526 is greater than a predetermined threshold, threshold 520, for the debounce time.

Figure 9:
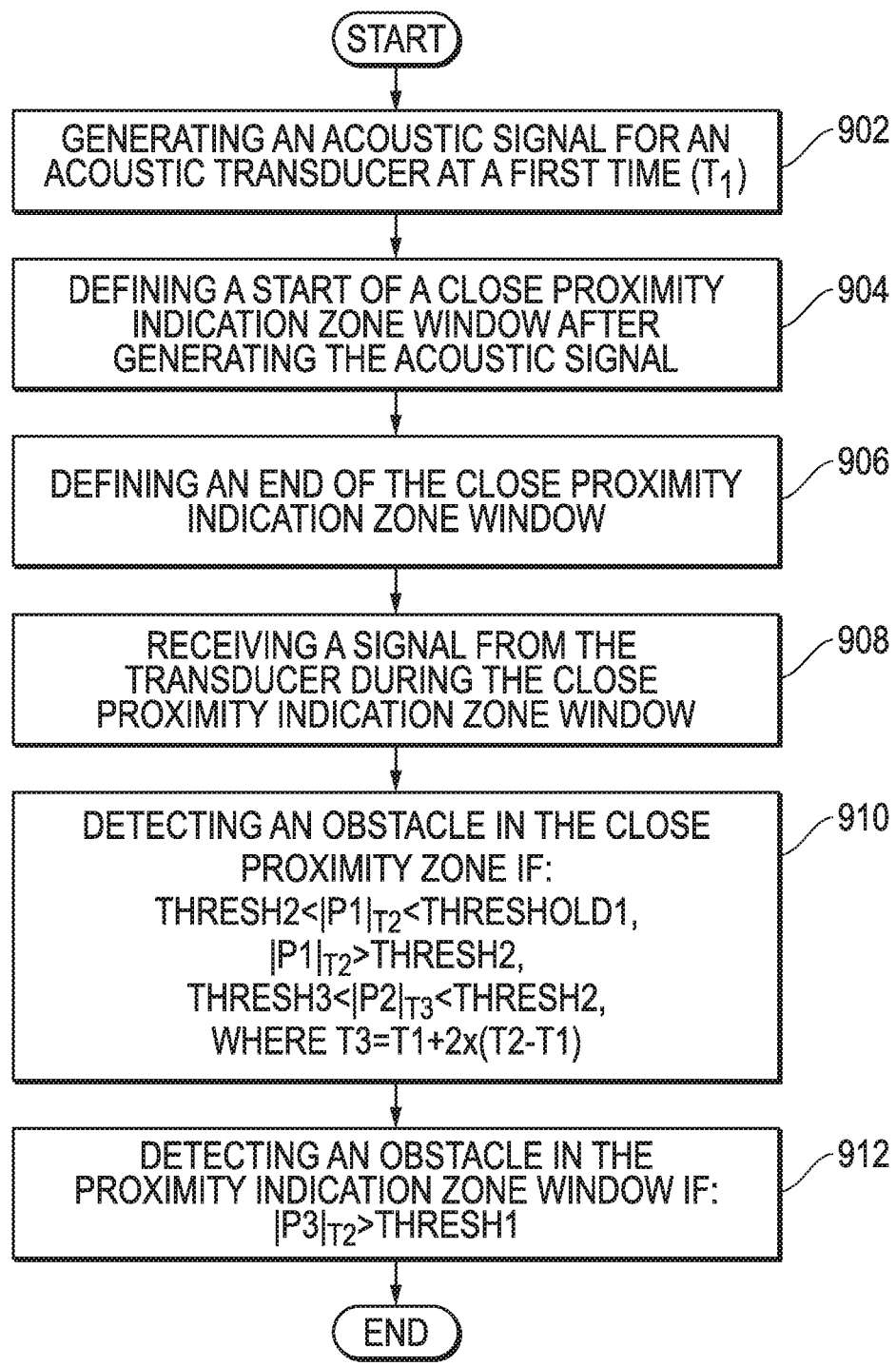
FIG. 9 illustrates a flow diagram of a method for detecting an obstacle in a first and second proximity indication zone according to an embodiment.

FIG. 9 illustrates a flow diagram of method 900 for detecting an obstacle in a first and second proximity indication zone. At block 902 an acoustic signal for an acoustic transducer at a first time is generated. A start of a close proximity indication zone window is defined after generating the acoustic signal at block 904. At block 906, an end of the close proximity indication zone window is defined. A signal is received from the acoustic transducer during the close proximity indication zone window at block 908. In response to receiving the signal from the acoustic transducer, an obstacle is detected in the close proximity indication zone window, at block 910, if the pulse received at the second time is greater than the second threshold and less than the first threshold, and the second pulse received at a third time is greater than the second threshold and less than the third threshold, where the third time equals two times the difference of the second and third time. At block 912 an obstacle is detected in the proximity indication zone if the third pulse at the second time is greater than the first threshold. The process concludes at the end block.

While the subject matter of the invention is described with specific preferred embodiments and example embodiments, the foregoing drawings and descriptions thereof depict only typical embodiments of the subject matter and are not therefore to be considered as limiting of its scope, and many alternatives and variations will be apparent to those skilled in the art. Inventive aspects of the present disclosure may lie in less than all features of a single foregoing disclosed embodiment.

Furthermore, some embodiments described herein include some but not other features included in other embodiments, and therefore combinations of features of different embodiments are meant to be within the scope of the disclosure, and form different embodiments, as would be understood by those skilled in the art.

What is claimed:

1. An acoustic distance measuring circuit, comprising:
a transmitter amplifier having an output adapted to be coupled to an acoustic transducer for providing an acoustic signal thereto;
a receiver amplifier having an input adapted to be coupled to the acoustic transducer and an output; and
a sensing circuit having an input coupled to the output of the receiver amplifier, and an output for providing a close proximity indication flag signal, for defining a start and an end of a close proximity indication zone window, detecting an obstacle at a first time in the close proximity indication zone window if a magnitude of a first pulse received from the acoustic transducer in a proximity indication zone window at a second time is less than a first threshold but greater than a second threshold for a debounce time, and a magnitude of a second pulse received from the acoustic transducer in the proximity indication zone window at a third time is less than the second threshold but greater than a third threshold for the debounce time, wherein the third time is equal to one and one-half of a difference between the second time and the first time and providing the close proximity indication flag signal in response to detecting the obstacle in the close proximity indication zone window.

2. The acoustic distance measuring circuit of claim 1, wherein the sensing circuit comprises:
a filter having an input coupled to the output of the receiver amplifier, and an output for providing a filtered envelope signal; and
a proximity indication zone detector having an input coupled to the output of the filter, and an output for providing the close proximity indication flag signal in response to detecting an obstacle in the close proximity indication zone window according to the filtered envelope signal.

3. The acoustic distance measuring circuit of claim 2, wherein the filter comprises:
a proximity signal filter circuit having an input coupled to the output of the receiver amplifier, a first output for providing an envelope of an input signal, and a second output for providing a floating average signal; and
a noise suppressor circuit having first and second inputs respectively coupled to the first output and the second output of the proximity signal filter circuit, and an output for providing the filtered envelope signal.

4. The acoustic distance measuring circuit of claim 3, wherein the proximity signal filter circuit comprises:
an analog-to-digital converter having an input coupled to the output of the receiver amplifier for receiving a pulse, and an output;
a bandpass filter and envelope detector having an input coupled to the output of the analog-to-digital converter for receiving the input signal, and an output for providing the envelope of the input signal; and
a first low pass filter having an input coupled to the output of the bandpass filter and envelope detector, and an output for providing the floating average signal.

5. The acoustic distance measuring circuit of claim 4, wherein the noise suppressor circuit comprises:
a noise background detector having an input coupled to the output of the bandpass filter and envelope detector, and an output;
a second low pass filter having an input coupled to the output of the noise background detector and an output for providing an average noise level signal; and
a noise remover having a first input coupled to the output of the second low pass filter, a second input coupled to the output of the bandpass filter and envelope detector, a third input coupled to the output of the first low pass filter, and an output for providing the filtered envelope signal.

6. The acoustic distance measuring circuit of claim 2, wherein the proximity indication zone detector further has a second output for providing a potential proximity indication zone flag signal in response to detecting an obstacle at a fourth time equal to twice an end of reverberation time of the acoustic transducer if a magnitude of a third pulse at the fourth time is greater than the first threshold for the debounce time.

7. The acoustic distance measuring circuit of claim 6, further comprising:
a temperature tracking circuit having an input coupled to the output of an analog-to-digital converter and an output for providing a ring time signal,
wherein the proximity indication zone detector further has a second input coupled to the output of the temperature tracking circuit for receiving the ring time signal.

8. A method comprising:
generating an acoustic signal for an acoustic transducer at a first time, wherein the acoustic transducer is susceptible to reverberation that defines a close proximity indication zone;
defining a start of a close proximity indication zone window after generating the acoustic signal;
defining an end of the close proximity indication zone window;

receiving a signal from the acoustic transducer during the close proximity indication zone window; and detecting an obstacle in the close proximity indication zone window if a magnitude of a first pulse received from the acoustic transducer outside the close proximity indication zone window at a second time is less than a first threshold but greater than a second threshold for a debounce time, and a magnitude of a second pulse received from the acoustic transducer in the close proximity indication zone window at a third time is less than the second threshold but greater than a third threshold for the debounce time, wherein the third time is equal to the first time plus two times a difference between the second time and the first time.

9. The method of claim 8, further comprising:

detecting an obstacle in a proximity indication zone window after the close proximity indication zone window if a magnitude of a third pulse received from the acoustic transducer in the proximity indication zone window is greater than the first threshold for a second debounce time.

10. The method of claim 8, further comprising:

estimating a distance of the obstacle in the close proximity indication zone window proportional to one-half the second time.

11. The method of claim 8, wherein the defining the start of the close proximity indication zone window comprises:

estimating an end of reverberation time in response to a temperature;

defining the start of the close proximity indication zone window in response to the estimating; and defining an end of the close proximity indication zone window in response to the estimating.

12. The method of claim 11, further comprising:

detecting a reverberation time period;

receiving a third pulse at twice the reverberation time period;

comparing a magnitude of the third pulse to the first threshold; and generating a potential proximity indication zone flag signal if the magnitude of the third pulse is greater than the first threshold.

13. The method of claim 12, wherein detecting the reverberation time period comprises:

measuring a current temperature; and varying the reverberation time period in response to an estimated effect of the current temperature on a reverberation time of the acoustic transducer.

14. The method of claim 12, further comprising:

receiving programmable values corresponding to the first threshold, the second threshold, the third threshold, and the debounce time.

15. The method of claim 14, further comprising:

filtering the signal from the acoustic transducer to provide a filtered signal; and detecting an obstacle in the close proximity indication zone in response to the filtered signal.

* * * * *